United States Patent [19]
Backlund et al.

[11] Patent Number: 5,708,105
[45] Date of Patent: Jan. 13, 1998

[54] DI-(ALKEN-1-YL)-SUBSTITUTED BORINIC ACIDS AND BORINATES AS OXIDATION INHIBITORS FOR CARBON COMPOSITES

[75] Inventors: Stephen John Backlund, Fair Oaks; Robert Earl Olsen, Placerville, both of Calif.

[73] Assignee: Aerojet-General Corporation, La Jolla, Calif.

[21] Appl. No.: 360,567

[22] Filed: Jun. 2, 1989

[51] Int. Cl.$^6$ .................... C03F 30/06; C03F 130/06; C03F 230/06

[52] U.S. Cl. .................................................. 526/239

[58] Field of Search ........................ 526/239, 285, 526/221; 524/701; 428/244; 562/239

[56] References Cited

PUBLICATIONS

STN Registry File; Chemical Abstracts Registry No.: 104503–69–7 and 95011–59–9, Structures attached.
Abstract RN 93223–08–6 (Registry Database Record and Chemical Abstracts Citation).
Fitzer, E., "The Future of Carbon–Carbon Composites," *Carbon*, 25(2): 163–190 (1987).
Brown, H.C. et al., "Reaction of Representative Alkynes With Monochloroborane Diethyl Etherate. A Simple Convenient Synthesis of Dialkenylchloroboranes via Hydroboration," *J. Org. Chem.*, 38(8): 1617–8 (1973).
Goto, K.S. et al., "A Review of Oxidation Kinetics of Carbon Fiber/Carbon Matrix Composites at High Temperature," *Trans. Iron Steel Inst. Japan*, 26(7): 597–603 (1986).
Luthra, K.L. et al., "Oxidation of Carbon/Carbon Composites—A Theoretical Analysis," *Carbon*, 26(2): 217–224 (1988).
McKee, D.W., "The Oxidation of Dispersed Refractory Metal Compounds and Their Behavior as Carbon Oxidation Catalysts," *Carbon*, 24(3): 331–6 (1986).
McKee, D.W., "Oxidation Behavior of Matrix–Inhibited Carbon/Carbon Composites," *Carbon*, 26(5): 659–665 (1988).
The STN International document is a printout of a computer search for Chemical Abstracts citations of borinic acids.
105:138657n Silicon carbide base sintered material containing boron as a sintering assistant.

*Primary Examiner*—Charles T. Jordan
*Assistant Examiner*—Meena Chelliah
*Attorney, Agent, or Firm*—Townsend and Townsend and Crew LLP

[57] ABSTRACT

Resins and carbon-carbon composites are formed from di(alken-1-yl) borinic acids and borinates, either as monomers or as nonpolymerizing additives in a monomer mixture, with the effect of sharply increasing the oxidative stability of the cured product. The compounds have the formula

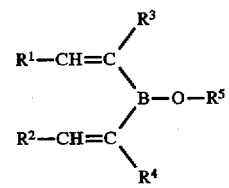

in which $R^1$, $R^2$, $R^3$, $R^4$ and $R^5$ are H, $C_1$–$C_6$ alkyl, $C_2$–$C_6$ alkenyl, $C_2$–$C_6$ alkynyl, $C_3$–$C_7$ cycloalkyl, $C_5$–$C_7$ cycloalkenyl, aryl, ($C_1$–$C_6$ alkyl)-substituted aryl, ($C_2$–$C_6$ alkenyl)-substituted aryl, or ($C_2$–$C_6$ alkynyl)-substituted aryl, at least one of $R^1$, $R^2$, $R^3$, $R^4$ and $R^5$ being other than H.

7 Claims, No Drawings

DI-(ALKEN-1-YL)-SUBSTITUTED BORINIC ACIDS AND BORINATES AS OXIDATION INHIBITORS FOR CARBON COMPOSITES

This invention relates to high-density carbon materials, and to the resins used in preparing such materials.

BACKGROUND OF THE INVENTION

High-density carbon-carbon composites are extremely strong materials capable of withstanding high temperatures. When compared with superalloys and ceramics, carbon-carbon composites alone exhibit the unusual property of maintaining strength at temperatures up to at least 4000° F. (2205° C.). Other attributes include thermal stability as a solid;

high resistance against thermal shock, due to high thermal conductivity and low thermal expansion behavior; and high strength and stiffness in high temperature application.

In view of these attributes, applications of such materials include their use as supersonic aircraft components, their use as the mold material in hot molding in powder metallurgy, and their use in nuclear reactors in the construction of high temperature heat exchangers.

Carbon-carbon composites exhibit only one major disadvantage—a tendency to undergo high temperature oxidation, forming carbon monoxide and carbon dioxide at about 500° C. in an oxidizing atmosphere. Numerous attempts have been made to overcome this tendency. Included among these are the use of pack cementation of silicon carbide as a primary oxidation barrier. Differences in the thermal expansion behavior between the silicon carbide coating and the carbon-carbon composite substrate, however, cause cracks to form within the silicon carbide layer upon exposure of the material to the temperature cycling normally encountered in use. Such cracks allow exposure of the carbon substrate to air, thereby permitting the high temperature oxidation to occur.

In an attempt to eliminate this problem, secondary protective systems have also been developed. Examples are the use of crack sealants added to the composite in particulate form. The crack sealants are borate glasses which seal cracks in the outer silicon carbide coatings as they form. Even with the crack sealants, however, the coatings are useful only in those applications where the temperature remains below the coating fabrication temperature. In addition, the borate glass is incompatible with the carbon-carbon matrix resin during processing, and is moisture sensitive as well, causing blistering, blooming and delamination, and thus precluding its use in a practical system.

Further attempts to overcome oxidation include the use of oxidation inhibitors in the form of inert particulate solids incorporated in the carbon-carbon composite as fillers. A typical composite will contain 60 parts resin to 40 parts inhibitor. The disadvantage of these inhibitors is that they are detrimental to the properties of the composite. They act as a solid barrier to compaction of composite ply layers during processing, and thus increase the spacing between the ply layers. This, combined with the amount of resin displaced by their presence, leads to significant reductions in such interlaminar properties as in-plane and interlaminar tensile strength.

SUMMARY OF THE INVENTION

It has now been discovered that certain di(alken-1-yl) substituted borinic acids and borinates are highly effective in the preparation of oxidation-inhibited resins for use in the manufacture of carbon-carbon composites. Such compounds include those which contain functional sites of unsaturation which permit polymerization and thus serve as starting materials for the resin itself, and those which lack such sites and serve instead as additives to monomers which do polymerize. The oxidation inhibition effect is thus achieved either by incorporation of the compounds into the polymer itself or by their incorporation into the resin as additives.

The compounds are useful alone or as blends with other compounds either within or outside the scope of the invention, including both monomers and prepolymers. In all cases, the borinic compounds of the invention provide an enhancement to oxidative stability at high temperatures while still retaining the beneficial performance properties of the resin materials of the prior art. The compounds are thus useful in the formation of resins, matrices and composites for use in high-density carbon materials, particularly carbon-carbon composites.

One advantage of the di(alken-1-yl) substituted borinic acids and borinates of the present invention is that they become uniformly distributed throughout the entire resin or matrix, in contrast to the particulate oxidation inhibitors described above, which form nonuniform areas of oxidation protection. A further advantage is that the resins and matrices of the present invention are insensitive to moisture, and thus significantly improved over the prior art in terms of durability under a wide range of operating conditions. It is indeed unexpected that these compounds can exhibit these properties and yet perform as high-density carbon materials in a manner comparable to those currently known.

DETAILED DESCRIPTION OF THE INVENTION AND PREFERRED EMBODIMENTS

Di(alken-1-yl) substituted borinic acids and borinates in accordance with the present invention are those having the formula

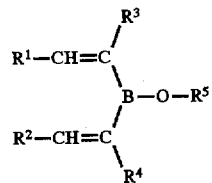

in which $R^1$, $R^2$, $R^3$, $R^4$ and $R^5$ may be the same or different, and each is selected from the following group: H, $C_1$–$C_6$ alkyl, $C_2$–$C_6$ alkenyl, $C_2$–$C_6$ alkynyl, $C_3$–$C_7$ cycloalkyl, $C_5$–$C_7$ cycloalkenyl, aryl, ($C_1$–$C_6$ alkyl)-substituted aryl, ($C_2$–$C_6$ alkenyl)-substituted aryl, and ($C_2$–$C_6$ alkynyl)-substituted aryl, with the proviso that at least one of $R^1$, $R^2$, $R^3$, $R^4$ and $R^5$ is other than H.

In preferred embodiments, the groups are defined as follows:

$R^1$ and $R^2$, which may be the same or different, are $C_1$–$C_6$ alkyl, $C_2$–$C_6$ alkenyl, $C_2$–$C_6$ alkynyl, $C_3$–$C_7$ cycloalkyl, $C_5$–$C_7$ cycloalkenyl, aryl, ($C_1$–$C_6$ alkyl)-substituted aryl, ($C_2$–$C_6$ alkenyl)-substituted aryl, or ($C_2$–$C_6$ alkynyl)-substituted aryl;

$R^3$ and $R^4$, which may be the same or different, are H or $C_1$–$C_6$ alkyl; and $R^5$ is H or $C_2$–$C_6$ alkynyl.

Within the latter definition, certain groups are more preferred.

For example, in the case of $R^1$ and $R^2$ the more preferred groups are $C_2-C_6$ alkenyl, $C_2-C_6$ alkynyl, $C_5-C_7$ cycloalkenyl, aryl, ($C_2-C_6$ alkenyl)-substituted aryl, and ($C_2-C_6$ alkynyl)-substituted aryl. Of these, $C_2-C_6$ alkenyl, $C_2-C_6$ alkynyl, aryl, ($C_2-C_6$ alkenyl)-substituted aryl, and ($C_2-C_6$ alkynyl)-substituted aryl are particularly preferred. Of the $C_5-C_7$ cycloalkenyl groups, cyclohexenyl is the most preferred, and of the aryl groups, phenyl is the most preferred. Of the $C_2-C_6$ alkenyl and $C_2-C_6$ alkynyl groups, vinyl and 3-butynyl, respectively, are the most preferred; and of the ($C_2-C_6$ alkenyl)-substituted phenyl and ($C_2-C_6$ alkynyl)-substituted phenyl, respectively, vinyl-substituted phenyl and ethynyl-substituted phenyl are the most preferred.

In the case of $R^5$, particularly preferred groups are H and $CH_2C{\equiv}CH$, with H being the most preferred.

A group of acetylenic starting materials of particular utility are those obtained by conversion of technical grade divinylbenzene to its acetylenic analog. Technical grade divinylbenzene is a mixture of divinyl and vinylethylbenzenes with minor amounts of diethylbenzenes and naphthalene. The divinylbenzenes are present in greater amounts than the vinylethylbenzenes, and the meta-isomers predominate. The acetylenic analogs of the mixture components are prepared by bromination followed by dehydrobromination, according to conventional techniques. Bromination may be accomplished by the non-catalyzed addition of bromine to the vinyl group, followed by bromination of the s-position of the ethyl groups through the use of a free-radical initiator or by refluxing in carbon tetrachloride. Dehydrobromination is achieved by the use of a non-nucleophilic base, such as potassium t-butoxide or a phase transfer catalyst with powdered potassium hydroxide. The resulting acetylenic compounds may be extracted with hexane, then purified by conventional techniques.

The borinic acids and borinates are readily prepared by conventional procedures well known among those skilled in the art. In accordance with one method of preparation, an appropriately substituted acetylenic compound or mixture of such compounds is reacted with a monohaloborane in an anhydrous organic solvent under an inert atmosphere. Once the reaction is complete, either water or an appropriate alcohol (corresponding to the $R^5$ group) is added to convert the substituted haloborane to either a borinic acid or a borinate, in accordance with the formula given above. Recovery of the product from the reaction mixture is achieved by conventional techniques.

Polymerization may be effected by simply heating the borinic acids or borinates to an elevated temperature. The reaction rate will vary with temperature, and preferred temperatures are those within a range of about 100° C. to about 250° C., preferably about 150° C. to about 200° C.

Those borinic acids or borinates which are not themselves polymerizable may be mixed with other monomers or prepolymers, and the mixture then polymerized, retaining the borinic acid or borinate molecules dispersed uniformly throughout the polymer matrix. The amount of boron compounds included in such resins may vary widely, the optimum amounts depending on the desired properties and intended uses of the product. In general, effective inhibition of oxidation with substantial retention of resin properties in most applications is achieved with levels of such boron compounds ranging from about 10% to about 70% by weight, with about 30% to about 60% preferred.

The polymers may be processed into high-performance structural materials in accordance with conventional techniques applicable to the processing of carbon-carbon composites. A carbon filler, such as finely divided graphite, for example, is generally used to increase the resin density, toughness and char yield. Surface-active agents, particularly nonionic surfactants, may be used to enhance the wetting of the graphite and to help avoid agglomeration. A typical procedure is as follows: curing at a temperature of about 100°–200° C., carbonization at a temperature of about 800°–1000° C., forming the carbonized resin into the desired structure, and finally graphitization at about 1800°–2500° C.

The following examples are offered for purposes of illustration, and are intended neither to limit nor to define the invention in any manner. Examples 1, 2, 3 and 4 illustrate the synthesis and properties of various di(alken-1-yl) substituted borinic acids within the scope of the invention which polymerize under the conditions described herein. Examples 5, 6 and 7 illustrate other di(alken-1-yl) substituted borinic acids also within the scope of the invention, which do not polymerize under the conditions described herein but instead are combined with polymerizable monomers. Example 8 is an illustration of a resin outside the scope of the invention, included for purposes of comparison. Examples 9 through 14 illustrate further polymerizable di(alken-1-yl) substituted borinic acids within the scope of the invention, formed from mixtures of starting materials.

Stability under high temperature oxidizing conditions was determined by conventional methods, employing Thermal Gravimetric Analysis (TGA) to continuously measure the sample weight loss in flowing air as the temperature is increased from ambient temperature to 1000° C. at a rate of 10° C. per minute. The oxidation stabilities of the borinic compounds of this invention were compared by this technique to that of an advanced carbon-carbon matrix resin, which is described in Example 8.

EXAMPLE 1

Bis(5-hexyne-1-ene-1-yl)borinic Acid

A 100-mL flask under a nitrogen atmosphere was charged with 7.80 g (100 mmol) of 1,5-hexadiyne and 50 mL of anhydrous methylene chloride. The resulting solution was cooled to 5° C., and 5.51 g (50 mmol) of monochloroborane-methyl sulfide complex was added at 5° to 10° C., then stirred for one hour at 0° to 5° C. and warmed to room temperature for one hour. The reaction mixture was poured into 50 mL of water; the phases separated and the aqueous phase was extracted with 2×25 mL of methylene chloride. The combined organic phase was washed with 25 mL of saturated $NaHCO_3$ and 25 mL of water. After drying over $MgSO_4$, the solvent was stripped to yield 3.02 g (32% yield) of product. The identity of the product was confirmed by nuclear magnetic resonance (NMR) and infrared spectroscopy (IR).

The product was cured at 165° C., then carbonized by heating to 1000° C. under helium, upon which treatment the product retained 36% of its original weight (char yield).

The carbonized material was then subjected to TGA to 1000° C. in flowing air. The temperature at which the weight loss reached 10% was 962° C., and the weight retention at 900° C. was 92%.

These data are listed in Table II together with data from the examples which follow.

EXAMPLE 2

Bis(1,3-butadien-1-yl)borinic Acid

The procedure of Example 1 was followed, except that the starting materials were 11.4 g (220 mmol) of a 50% solution of 1-buten-3-yne in xylene and 11.0 g (100 mmol) of monochloroborane-methyl sulfide complex. The result was 5.10 g (38% yield) of product soluble in methylene chloride. The product identity was confirmed by NMR and IR.

Tested by the procedures of Example 1, the product gave a char yield of 30%, and an oxidation TGA scan in flowing air showing a 10% weight loss at 721° C. and a 76% yield at 900° C.

EXAMPLE 3

Bis[2-(ethynyl/vinylphenyl)ethen-1-yl]borinic Acid

This example begins with the preparation of a mixture of diethynylbenzene and vinylethynylbenzene, used as reactants in the preparation of the borinic acid.

A 1-liter, round-bottomed flask fitted with addition funnel, thermometer, stirrer, ice-water cooling bath, and nitrogen purge connected to a caustic trap was charged with 500 mL of carbon tetrachloride and 100 g of technical grade divinylbenzene (analysis shown in Table I below). The solution was cooled to 10° C., and bromine (256 g, 1.6 mole) was added dropwise, maintaining the reaction temperature at less than 20° C. by controlling the rate of addition. Benzoyl peroxide (5.0 g, 20.6 mmol) was added, and the mixture slowly heated to reflux (79° C.). (Caution: HBr evolved.) The process was monitored by capillary column gas chromatography, and when conversion to α-bromoethyl-1, 2-dibromoethylbenzene reached 99%, heating was discontinued. After cooling to ambient, the reaction mixture was washed with 100 mL of 25% caustic solution and then twice with 250 mL aliquots of water. The solution was dried ($MgSO_4$) and stripped to yield 317 g (102%) of yellow solid.

A 3-liter, round-bottomed flask fitted with high speed agitation, reflux condenser, thermometer and static nitrogen head was charged with 600 mL of petroleum ether, 135 g of brominated divinylbenzene (prepared in the preceding paragraph), 6.6 g (0.012 mol) of tetraoctyl ammonium bromide and 316 g (5.6 mol) of powdered potassium hydroxide. The rapidly stirred mixture was heated to reflux (75° to 80° C.) until the reaction was complete (about 3 hours) as shown by capillary column gas chromatography. the mixture was filtered, the filter cake washed with 100 mL of petroleum ether, and the combined filtrates stripped to yield 31.2 g (88% yield) of pale yellow liquid. The analysis of the resulting monomer mixture is shown in Table I below together with that of the starting material.

TABLE I

| Capillary Column Gas Chromatograph Area Percent Analysis of Technical-Grade Divinylbenzene and Monomer Mixture | | | |
|---|---|---|---|
| Starting Material | Area % | Monomer Mixture | Area % |
| m-divinyl | 41.2 | m-diethynyl | 46 |
| p-divinyl | 15.4 | p-diethynyl | 15 |
| m-vinylethyl | 30.9 | m-vinylethynyl | 29 |
| p-vinylethyl | 8.5 | p-vinylethynyl | 9 |
| m-diethyl | 0.9 | m,p-divinyl | <1 |
| p-diethyl | 0.9 | | |
| naphthalene | 1.6 | naphthalene | <1 |

The borinic acid was then prepared as follows.

A dry 100-mL, round-bottomed flask equipped with a nitrogen atmosphere was charged with 12.6 g (0.1 mol) of the diethynylbenzene/vinylethynylbenzene monomer mixture and 50 mL of anhydrous methylene chloride. The solution was cooled to 3° C. using an ice-water bath, and 5.52 g (0.05 mol) of monochloroborane dimethylsulfide complex was added dropwise, maintaining the temperature below 10° C. The solution was then stirred one hour between 0° C. and 5° C., allowed to warm to 25° C., then stirred at that temperature for an additional hour. The reaction was quenched by the addition of 25 mL of water and the phases separated. The organic layer was extracted with 25 mL of saturated $NaHCO_3$ solution, then 25 mL of water, then dried over $MgSO_4$. Removal of solvent under reduced pressure left 10.64 g (76% yield) of bis(vinyl/ethynylphenyl) ethylidenyl borinic acid as an orange oil. The presence of vinyl, vinylene and ethynyl protons in the product was established by NMR, which gave the expected absorption patterns for these protons which result from a mixed meta- and para- aromatic substitution. Fourier Transform IR confirmed the presence of a terminal ethynyl group. The product was determined to be soluble in methylene chloride, acetone and the monomer mixture from which it was prepared. The product was insoluble in methanol, ethanol and propanol, and partially soluble in toluene Tested by the procedures of Example 1, the product gave a char yield of 69% and an oxidation TGA scan in flowing air showing a 10% weight loss at 810° C. and an 85% yield at 900° C.

EXAMPLE 4

Propargyl Bis[2-(ethynyl/vinylphenyl)ethen-1-yl] borinate

A 50-mL flask under nitrogen atmosphere was charged with 20 mL of methylene chloride and 5.04 g (40 mmol) of a monomer mixture identical to that prepared in Example 3. The solution was cooled to 5° C., and 2.21 g (20 mmol) of monochloroborane-methyl sulfide complex was added at 5° to 10° C., then stirred for one hour at 0 to 5° C., followed by one hour at 25° C. The solution was then cooled to 5° C., and 140 g (25 mmol) of propargyl alcohol was added to form the borinated ester. The reaction mixture was then warmed to room temperature, stirred for one hour, and the solvent removed under reduced pressure to give the product in 95% yield, with identity confirmed by NMR and IR.

Tested by the procedures of Example 1, the product gave a char yield of 50% and an oxidation TGA scan in flowing air showing a 10% weight loss at 674° C. and an 82% yield at 900° C.

EXAMPLE 5

Bis(2-phenyl-1-ethen-1-yl )borinic Acid

This example illustrates the preparation of a nonpolymerizable borinic acid within the scope of the invention, which, once prepared, is combined with the monomer mixture of Example 3, and the entire mixture cured.

The borinic acid was prepared in a manner analogous to the procedure described in Example 1, using as starting materials 12.78 g (110 mmol) of 1-phenyl-1-propyne and 5.52 g (50 mmol) of monochloroborane-methyl sulfide complex. The reaction yielded 9.37 g (72%) of product, identity confirmed by NMR and IR.

The product was combined with an equal weight of the monomer mixture of Example 3, and the resulting mixture cured and tested by the procedures of Example 1, giving a char yield of 60% and an oxidation TGA scan in flowing air showing a 10% weight loss at 737° C. and a 62% yield at 900° C.

EXAMPLE 6

Bis (2-phenyl-1-ethen-1-yl)borinic Acid

This example illustrates the preparation of an additional nonpolymerizable borinic acid within the scope of the invention, which, as in Example 5, is combined with the monomer mixture of Example 3, and the entire mixture cured.

The borinic acid was prepared in a manner analogous to the procedure described in Example 1, using as starting materials 11.24 g (110 mmol) of phenylacetylene and 5.52 g (50 mmol) of monochloroborane-methyl sulfide complex. The product yield was 8.07 g (68% yield), identity confirmed by NMR and IR.

The product was combined with an equal weight of the monomer mixture, and the resulting mixture cured and tested by the procedures of Example 1, giving a char yield of 45%, and an oxidation TGA scan in flowing air showing a 10% weight loss at 694° C. and a 69% yield at 900° C.

EXAMPLE 7

Bis[2-(1-cyclohexene)ethen-1-yl]borinic Acid

This example illustrates the preparation of a third nonpolymerizable borinic acid within the scope of the invention, which, as in Example 5, is combined with the monomer mixture of Example 3, and the entire mixture cured.

The borinic acid was prepared in a manner analogous to the procedure described in Example 1, using as starting materials 11.68 g (110 mmol) of 1-ethynylcyclohexene and 5.52 g (50 mmol) of monochloroborane-methyl sulfide complex. The product yield was 5.64 g (47% yield), identity confirmed by NMR and IR.

The product was combined with an equal weight of the monomer mixture, and the resulting mixture cured and tested by the procedures of Example 1, giving a char yield of 38%, and an oxidation TGA scan in flowing air showing a 10% weight loss at 600° C. and a 78% yield at 900° C.

EXAMPLE 8

Comparison Example

Poly(diethynylbenzene-vinylethynylbenzene)

This example illustrates the cure and oxidation stability properties of the monomer mixture described in Example 3 above, without the addition of borinic acids within the scope of the invention.

A resin was prepared from the monomer mixture by combining 50 g of the monomer mixture with 200 mL of xylene in a 500-mL, round-bottomed flask fitted with reflux condenser, thermometer and stirrer, and heating the resulting solution to 120° C., while monitoring the progress of the reaction by capillary column gas chromatography. After 42 hours of heating, the reaction solution was cooled to ambient temperature, then added to 2 L of methanol. The polymer precipitated as a fine yellow-brown solid, which was dried to constant weight under vacuum at 50° C. to give 18.6 g.

The polymer was then dissolved in a further amount of the same monomer mixture, at a polymer/monomer weight ratio of 55/45, and cured and tested by the procedures of Example 1. The results were a char yield of 84%, and an oxidation TGA scan in flowing air showing 10% weight loss at 629° C., and complete product loss at 800° C.

Examples 1 through 8 are summarized in Table II.

TABLE II

OXIDATION STABILITY OF BIS(ETHEN-1-YL) SUBSTITUTED BORINIC ACIDS $$\left[ R^1-CH=C{\overset{R^3}{\underset{}{|}}} \right]_2 -B-O-R^5$$

| | Structure | | | Yields, % | | Thermogravimetric Analysis* | |
|---|---|---|---|---|---|---|---|
| | | | | | | Temp. at 10% wt. | % Yield at |
| No. | $R^1$ | $R^3$ | $R^5$ | Synthesis | Char | loss(°C.) | 900° C. |
| 1 | HC≡C(CH$_2$)$_2$ | H | H | 32 | 36 | 962 | 92 |
| 2 | H$_2$C=CH | H | H | 38 | 30 | 721 | 76 |
| 3 | phenyl-R | H | H | 76 | 69 | 810 | 85 |
| 4 | cyclohexenyl-R | H | CH$_2$C≡CH | 95 | 50 | 674 | 82 |

[The "R" in Examples 3 and 4 is a 60/40 mixture of ethynyl and vinyl groups, primarily in the meta-position, as listed in Table I.]

TABLE II-continued

OXIDATION STABILITY OF BIS(ETHEN-1-YL) SUBSTITUTED BORINIC ACIDS

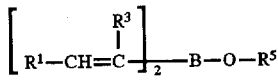

| | Structure | | | Yields, % | | Thermogravimetric Analysis[a] | |
|---|---|---|---|---|---|---|---|
| | | | | | | Temp. at 10% wt. | % Yield at |
| No. | $R^1$ | $R^3$ | $R^5$ | Synthesis | Char | loss(°C.) | 900° C. |

The following were used as additives in a 60/40 monomer mixture of diethynylbenzene and vinylethynylbenzene, primarily meta-, as listed in Table I, the additives comprising 50% by weight of the mixture:

| 5 |  | CH₃ | H | 72 | 60 | 737 | 62 |
| 6 |  | H | H | 68 | 45 | 694 | 69 |
| 7 |  | H | H | 47 | 38 | 600 | 78 |

For comparison: the following was formed from a prepolymer derived solely from the 60/40 monomer mixture, with no borinic compounds included:

| 8 | — | — | — | — | 84 | 629 | 0 (at 800° C.) |

[a]Dynamic TGA at heating rate 10° C./min, flowing air.

EXAMPLES 9 TO 12

Borinic Acids of Mixed Composition

The procedure of Example 1 was repeated four times, using as starting materials mixtures of 1,5-hexadiyne and the monomer mixture of Example 3 in various proportions, each combination totaling 100 mmol, and 5.52 g (50 mmol) of monochloroborane-methyl sulfide complex. One set of starting materials was also used at five times this amount. The relative amounts of the hexadiyne and the monomer mixture for each combination are listed in Table III, together with synthesis yields, char yields, and TGA scan data for the polymerized product. Also included in the table are the data from Examples 4 and 1, copied from Table II, representing 100% monomer mixture and 100% hexadiyne, respectively.

TABLE III

OXIDATION STABILITY OF BORINIC ACIDS PREPARED FROM MIXTURES OF ALKYL AND ARYL ACETYLENES

| | Relative Amounts of Acetylenic Starting Materials | | Yields, % | | Thermogravimetric Analysis[b] | |
|---|---|---|---|---|---|---|
| No. | HC≡C(CH₂)₂C≡CH | ⌬—C≡CH (R) | Synthesis | Char | Temp. at 10% wt. loss(°C.) | % Yield at 900° C. |
| 4 | 0 | 100 | 76 | 69 | 810 | 85 |
| 9 | 5 | 95 | 74 | 63 | 1014 | 93 |
| 10 | 10 | 90 | 75 | 65 | 829 | 83 |
| | | | (86)[a] | (61)[a] | (1000)[a] | (94)[a] |
| 11 | 17 | 83 | 65 | 66 | 914 | 91 |

TABLE III-continued

OXIDATION STABILITY OF BORINIC ACIDS PREPARED FROM MIXTURES OF ALKYL AND ARYL ACETYLENES

| | Relative Amounts of Acetylenic Starting Materials | | Yields, % | | Thermogravimetric Analysis[b] | |
|---|---|---|---|---|---|---|
| No. | $HC≡C(CH_2)_2C≡CH$ | Ar-C≡CH (R) | Synthesis | Char | Temp. at 10% wt. loss(°C.) | % Yield at 900° C. |
| 12 | 25 | 75 | 60 | 70 | 831 | 83 |
| 1 | 100 | 0 | 32 | 36 | 962 | 92 |

"R" in the formula heading the third column represents a 60/40 mixture of ethynyl and vinyl groups, as listed in Table I.
[a]Parentheses indicate scale-up by factor of 5. Modified product isolation procedures were used in synthesis.
[b]Dynamic TGA at heating rate 10° C./min in flowing air.

EXAMPLES 13 AND 14

Varying Reactant Mole Ratios

The procedure of Example 1 was repeated an additional two times, using as starting materials a 25/75 mixture of 1,5-hexadiyne and the monomer mixture of Example 3 (as in Example 12), and the monochloroborane-methyl sulfide complex, at two different mole ratios of the monochloroborane to the 25/75 mixture (0.625 and 0.75, the mole ratio in Example 12 being 0.5). The synthesis yields, char yields, and TGA scan data for the polymerized product in each case are listed in Table IV. It is noted that an increase in monochloroborane usage over the nominal 0.5 mole ratio results in increased oxidation stability.

TABLE IV

SYNTHESIS, YIELD AND OXIDATIVE STABILITY OF BIS(ETHENYL)BORINIC ACID AS FUNCTION OF MOLE RATIO OF MONOHALOBORANE TO ACETYLENIC COMPONENTS

Acetylenic Components: $HC≡C(CH_2)_2C≡CH$ (25%) and Ar-C≡CH with R = 60/40 mixture of ethynyl and vinyl groups, as listed in Table I (75%)

| No. | Mol Ratio $BH_2Cl$ to Acetylenic Mixture | Yields, % Synthesis | Yields, % Char | Thermogravimetric Analysis[a] Temp. at 10% wt. loss(°C.) | % Yield at 900° C. |
|---|---|---|---|---|---|
| 12 | 0.5 | 60 | 70 | 831 | 83 |
| 13 | 0.625 | 65 | 61 | 957 | 92 |
| 14 | 0.75 | 54 | 59 | 909 | 91 |

[a]Dynamic TGA at heating rate of 10° C. /min in flowing air.

EXAMPLE 15

Behavior Upon Moisture Exposure

The product prepared in Example 3 was tested for moisture sensitivity by two methods.

In the first test, a film of the resin was cast, cured at 165° C., carbonized by heat treatment to 1000° C. under an inert atmosphere, and subjected to TGA under dry air. A second sample of the same material was treated similarly, except that air saturated with water at 25° C. was used in place of the dry air. Both dynamic and isothermal TGA's were performed on each sample, the dynamic TGA involving a 10° C./minute temperature rise to 1000° C., and the isothermal TGA being a two-hour test at 700° C.

In the dynamic TGA tests, the carbonized resin retained 85% of its weight in the dry air and 90% of its weight in the wet air, in both cases as the temperature reached 1000° C. In both isothermal tests, the samples retained about 93%.

In the second test, samples of cured and of carbonized resin were placed in an environmental oven (80% relative humidity and 80° F. or 27° C.) for two weeks, then dried under vacuum for three days at about 75° F. (24° C.). Weight changes were recorded both during the oven conditioning and after drying, and are listed in Table V, which shows that small amounts of water were absorbed under the humidity conditions, most of which was retained upon drying.

TABLE V

WEIGHT CHANGES ON CONDITIONING IN HUMID AIR

| | Weight Gain on Conditioning | | Weight Gain After Drying Con- |
|---|---|---|---|
| Resin Treatment | 7 Days | 14 Days | ditioned Sample |
| Cured at 165° C. | 0.56% | 0.93% | 0.70% |
| Carbonized at 1000° C. | 1.7 | 2.5 | 2.0 |

The humidity conditioned samples were tested for oxidation stability by both dynamic and isothermal TGA according to the procedures described above. The results, expressed in terms of percent of the original weight retained, are listed in Table VI.

TABLE VI

OXIDATION STABILITY BEFORE AND AFTER CONDITIONING IN HUMID AIR

| Resin Treatment | Dynamic TGA[a] | | Isothermal TGA[b] | |
|---|---|---|---|---|
| | Before | After | Before | After |
| Cured at 165° C. | 62% | 52% | — | — |
| Carbonized at 1000° C. | 85% | 94% | 93% | 96% |

[a]Dynamic TGA at heating rate 10° C./min to 1000° C. in flowing air.
[b]Isothermal TGA at 700° C. for two hours.

The foregoing is offered primarily for purposes of illustration. It will be readily apparent to those skilled in the art that variations, modifications and substitutions in the materials and procedures described above may be made without departing from the spirit and scope of the invention.

What is claimed is:

1. A carbon-carbon composite comprising a combination of a carbon filler and a cured resin formed by polymerization of a monomer composition containing an organic boron-containing compound that is not oxidized and does not form a separate glassy phase but is uniformly distributed throughout the cured resin and having the formula:

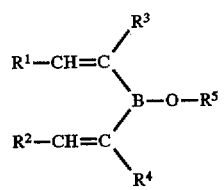

in which $R^1$, $R^2$, $R^3$, $R^4$, and $R^5$ are independently selected from the group consisting of H, $C_1$–$C_6$ alkyl, $C_2$–$C_6$ alkenyl, $C_2$–$C_6$ alkynyl, $C_3$–$C_7$ cycloalkyl, $C_5$–$C_7$ cycloalkenyl, aryl, ($C_2$–$C_6$ alkyl)-substituted aryl, ($C_2$–$C_6$ alkenyl)-substituted aryl, and ($C_2$–$C_6$ alkynyl)-substituted aryl, with the proviso that at least one of $R^1$, $R^2$, $R^3$, $R^4$ and $R^5$ is other than H.

2. A carbon-carbon composite in accordance with claim 1 in which:
   $R^1$ and $R^2$ are independently selected from the group consisting of $C_1$–$C_6$ alkyl, $C_2$–$C_6$ alkenyl, $C_2$–$C_6$ alkynyl, $C_3$–$C_7$ cycloalkyl, $C_5$–$C_7$ cycloalkenyl, aryl, ($C_1$–$C_6$ alkyl)-substituted aryl, ($C_2$–$C_6$ alkenyl)-substituted aryl, and ($C_2$–$C_6$ alkynyl)-substituted aryl;
   $R^3$ and $R^4$ are independently selected from the group consisting of H and $C_1$–$C_6$ alkyl; and
   $R^5$ is selected from the group consisting of H and $C_2$–$C_6$ alkynyl.

3. A carbon-carbon composite in accordance with claim 1 in which $R^1$ and $R^2$ are independently selected from the group consisting of $C_2$–$C_6$ alkenyl, $C_2$–$C_6$ alkynyl, cyclohexenyl, phenyl, ($C_2$–$C_6$ alkenyl)-substituted phenyl, and ($C_2$–$C_6$ alkynyl)-substituted phenyl; $R^3$ and $R^4$ are independently selected from the group consisting of H and $CH_3$; and $R^5$ is selected from the group consisting of H and $CH_2C{\equiv}CH$.

4. A carbon-carbon composite in accordance with claim 1 in which $R^1$ and $R^2$ are independently selected from the group consisting of vinyl-substituted phenyl and ethynyl-substituted phenyl, $R^3$ and $R^4$ are both H, and $R^5$ is H.

5. A carbon-carbon composite in accordance with claim 1 in which said monomer composition is comprised of at least one monomer selected from the group consisting of

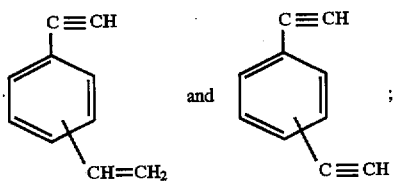

and $R^1$ and $R^2$ are independently selected from the group consisting of aryl, ($C_1$–$C_6$ alkyl)-substituted aryl, and $C_5$–$C_7$ cycloalkenyl.

6. A carbon-carbon composite in accordance with claim 1 in which said monomer composition is comprised of at least one monomer selected from the group consisting of

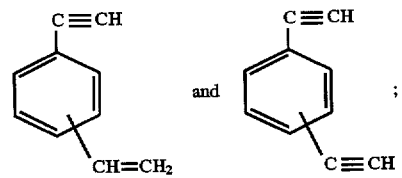

and $R^1$ and $R^2$ are independently selected from the group consisting of phenyl, ($C_1$–$C_6$ alkyl)-substituted phenyl, and cyclohexenyl.

7. A carbon-carbon composite in accordance with claim 1 in which said monomer composition is comprised of a combination of the following monomers

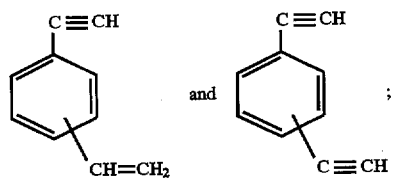

and $R^1$ and $R^2$ are independently selected from the group consisting of phenyl and cyclohexenyl.

* * * * *